E. D. WEST.
TIRE CARRIER.
APPLICATION FILED MAR. 17, 1917.
1,256,493.    Patented Feb. 12, 1918.
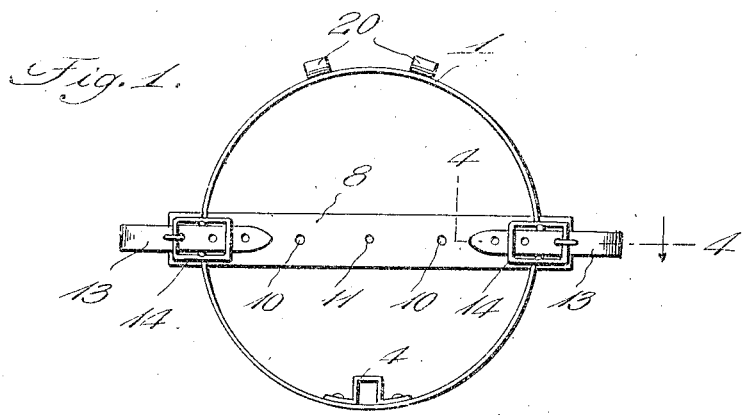
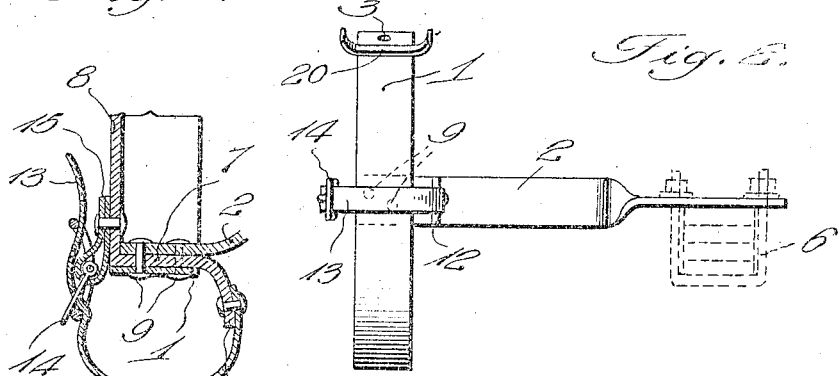
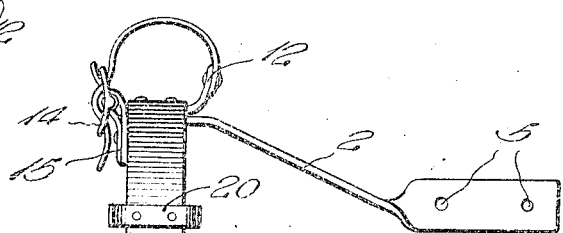
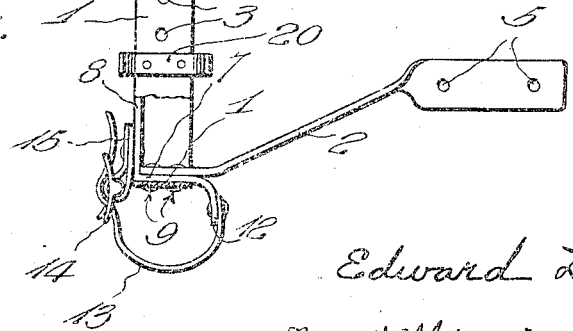
Inventor
Edward D. West
By William B. Deane
his Attorney

UNITED STATES PATENT OFFICE.

EDWARD D. WEST, OF EAST POINT, GEORGIA, ASSIGNOR TO JOHN M. SANDERS, OF ATLANTA, GEORGIA.

TIRE-CARRIER.

1,256,493.  Specification of Letters Patent.  Patented Feb. 12, 1918.

Application filed March 17, 1917. Serial No. 155,510.

*To all whom it may concern:*

Be it known that I, EDWARD D. WEST, citizen of the United States, residing at East Point, in the county of Fulton and State of Georgia, have invented certain new and useful Improvements in Tire-Carriers, of which the following is a specification.

My present invention pertains to tire carriers for automobiles; and it consists in the peculiar and advantageous construction of tire carrier as hereinafter described and particularly pointed out in my appended claim.

In the accompanying drawings which are hereby made a part hereof:

Figure 1 is a rear elevation of the tire carrier that constitutes the best practical embodiment of my invention that I have as yet devised.

Fig. 2 is a side elevation of the same.

Fig. 3 is a top plan view.

Fig. 4 is an enlarged detail horizontal section, taken in the plane indicated by the line 4—4 of Fig. 1, and illustrating the novel and advantageous relative arrangement of the tire-supporting band, the tire-securing straps, and the cross-bar terminals that constitute abutments against which the tire is fastened and by which the tire is held against forward displacement from the band.

Among other elements my novel carrier comprises a band 1, and arms 2 that reach forwardly from the band. In its upper portion the band is provided with apertures 3, designed to receive the valve of an inner tube when the latter is placed on the band. To the inner side of the lower portion of the band is fixedly connected a metallic loop 4 for the passage of the chain or strap (not shown) employed in the locking of a tire on the band.

The forward portions of the arms 2 are horizontally disposed, and in each of said forward portions are two apertures 5 for the reception of the legs or shackles 6; it being my purpose in applying the carrier to remove the plates from the bottoms of the rear springs of an automobile, and then secure the arms 2 on the legs of the shackles or clips.

The rear end portions of the arms 2 are disposed within the band 1 and in spaced relation thereto, and interposed between the said arm portions and the band are the forwardly-extending intermediate portions 7 of a diametrical bar 8; the said arm portions, the bar portions 7 and the band 1 being fixedly and strongly connected together by transverse rivets 9. At 10—10 the bar 8 is preferably provided with apertures for the attachment of the plate (not shown) bearing the car number, and at 11 in the bar is formed an aperture designed for the attachment of the tail-light (also not shown) of the machine. The said forwardly extending intermediate portions 7 of the bar 8 merge into terminal portions 12 that constitute important parts of my device. These terminal portions 12 extend laterally outward, relative to the forward edge of the band, and are therefore adapted to serve as abutments in preventing forward displacement of a tire from the band. Said terminal portions 12 also serve for the permanent connection of securing straps 13 which are lapped against the forward sides of the terminal portions and are fitted to be engaged by buckles 14 on tabs or straps 15 permanently affixed to the rear side of the diametrically-disposed bar 8.

20—20 are concave clips arranged transversely on and fixedly connected to the band 1 at opposite sides of and spaced from the apertures 3. The said clips 20 are calculated to receive the tire and support and hold the same against slipping forwardly or rearwardly, this with a view to precluding injury to the valve tube of the tire when said valve tube is disposed in one of the apertures 3.

In the practical use of my novel carrier, the tire to be carried is arranged on the band 1 and in the clips 20 with its forward side opposed to the rear sides of the lateral abutments, specifically terminal portions 12, on the band, and the straps 13 are then passed around the tire and engaged with the buckles 14, after which the tire may, if desired, be locked on the band in the manner before alluded to. It is to be noticed in considering the lateral abutments 12 that they are preferably concave at their rear sides in conformity with the transverse curvature of a tire and so as to snugly seat the same; also, that they serve the highly important function of fenders in preventing undue compression of and consequent injury to the tire when the straps 13 are drawn taut with a view to preventing casual shocking or other movement of the tire on the band.

It will further be appreciated from the foregoing that in addition to serving for the connection of a number plate and tail-light as hereinbefore stated, the diametrical bar 8 is calculated to reinforce and lend increased stiffness and strength to the band 1, as well as to strengthen the connection of the arms 2 to the band and form by its terminals the highly important lateral abutments 12.

Having described my invention, what I claim and desire to secure by Letters Patent, is:

A tire-carrier for automobiles, comprising an approximately vertically arranged band; transverse clips secured to the upper portion of the band and adapted for the reception of a tire and to hold the same against substantial forward and rearward movements; a substantially horizontal bar disposed adjacent the rear side of the band and passing through the center of the band and having its ends bent at substantially a right angle to provide intermediate extensions which are arranged inwardly of and extend across the band for its entire width in contact therewith, said intermediate extensions being provided at their forward ends with curved substantially horizontal terminal extensions to serve as stops for the tire; straps secured to the terminal extensions; buckles secured to the bar and adapted to engage with the straps; support arms arranged on edge in substantially vertical planes and having their rear ends disposed inwardly of and upon the intermediate extensions and extending for substantially the entire length of said intermediate extensions; and means to rigidly bind the overlapping band, intermediate extensions, and ends of the arms together.

In testimony whereof I affix my signature in presence of two witnesses.

EDWARD D. WEST.

Witnesses:
W. H. COUCH,
R. S. PARY.